United States Patent [19]

Baghai et al.

[11] Patent Number: 5,905,868
[45] Date of Patent: May 18, 1999

[54] CLIENT/SERVER DISTRIBUTION OF PERFORMANCE MONITORING DATA

[75] Inventors: Ali Baghai, San Diego; Karmen Gharakhanian, Costa Mesa; Guy Ken Ishimoto, San Diego; Larry Wai H. Kam, West Hollywood; Robert Jerald MacDonald, San Diego; William Paul Thomas, Vista; Ashok Kumar Iyengar, Oceanside, all of Calif.

[73] Assignee: NCR Corporation, Dayton, Ohio

[21] Appl. No.: 08/898,149

[22] Filed: Jul. 22, 1997

[51] Int. Cl.⁶ .............................. G06F 13/00; G06F 15/16
[52] U.S. Cl. ................ 395/200.54; 395/200.31; 395/200.33
[58] Field of Search ..................... 395/200.54, 200.31, 395/200.33

[56] References Cited

U.S. PATENT DOCUMENTS

| 5,761,696 | 6/1998 | Giordano et al. | 711/6 |
| 5,778,179 | 7/1998 | Kanai et al. | 395/200.33 |
| 5,781,449 | 7/1998 | Rosborough | 395/200.54 |
| 5,781,743 | 7/1998 | Matsumo et al. | 395/200.58 |
| 5,787,251 | 7/1998 | Hamilton et al. | 395/200.33 |

OTHER PUBLICATIONS

*Top End Topics*, Top End Marketing Team, Feb./Mar. 1996 Issue, pp. 1–5.

*Primary Examiner*—Krisna Lim
*Attorney, Agent, or Firm*—Merchant & Gould

[57] ABSTRACT

A performance monitoring system uses a client/server architecture across a network including a plurality of interconnected computers. A data collector process collects and stores data from a monitored process, wherein the data collector process allows a user to control a frequency of collection for each of one or more different types of the collected data and gathers the different types of the collected data in parallel from the monitored process. A server process distributes the data collected by the data collector process to one or more client processes. Each client process manages a connection with the server process on behalf of one or more performance monitoring applications and relays data requests to the server process and delivers results therefrom to the performance monitoring applications.

23 Claims, 9 Drawing Sheets

Collection Frequency

Collection Frequencies    Current DBS Rates

Data Types    Current  New

| Data Type | Current | New | DBS Rate | |
|---|---|---|---|---|
| [X] Monitor Session | 1200 | 1200 | Session Local | 1200 |
| | | | Session System | 1200 |
| [X] Monitor Virtual Config | 600 | 600 | VProc Monitor | 600 |
| [X] Monitor Virtual Summary | 600 | 600 | | |
| [X] Monitor Virtual Resource | 600 | 600 | | |
| [ ] Monitor Physical Config | 3600 | 3600 | Node Monitor | 600 |
| [ ] Monitor Physical Summary | 500 | 500 | | |
| [X] Monitor Physical Resource | 600 | 600 | | |

OK    Cancel    Sync w/DBS    Help

FIG. 3

CLIENT/SERVER DISTRIBUTION OF PERFORMANCE MONITORING DATA

BACKGROUND OF THE INVENTION

1. Field of the Invention.

This invention relates in general to techniques for monitoring the performance of computer systems, and in particular, to techniques for collecting and managing performance data in a network.

2. Description of Related Art.

A variety of management and administrative software applications for database systems (DBS) require access to performance monitoring data generated by the DBS. Client programs such as these may connect to the DBS and execute queries to collect the necessary data. When multiple clients are interested in accessing performance data from the same DBS at the same time, they can each connect to the database and execute their own queries; the DBS can thus become burdened with redundant work. Furthermore, the number of clients allowed to connect and gather performance data is often constrained by the amount of DBS resources (e.g., memory, network connections) allocated for such activity.

As the DBS to be monitored grows in size and complexity, the data to be monitored and tested grows the same way. What are needed are improvements in the structure of the DBS and monitoring applications to reduce the overhead requirements, of conventional monitoring applications:

SUMMARY OF THE INVENTION

To overcome the limitations in the prior art described above, and to overcome other limitations that will become apparent upon reading and understanding the present specification, the present invention discloses a performance monitoring system using a client/server architecture across a network including a plurality of interconnected computers. A data collector process collects and stores data from a monitored process, wherein the data collector process allows a user to control a frequency of collection for each of one or more different types of the collected data and gathers the different types of the collected data in parallel from the monitored process. A server process distributes the data collected by the data collector process to one or more client processes. Each client process manages a connection with the server process on behalf of one or more performance monitoring applications and relays data requests to the server process and delivers results therefrom to the performance monitoring applications.

BRIEF DESCRIPTION OF THE DRAWINGS

Referring now to the drawings in which like reference numbers represent corresponding parts throughout:

FIG. 3 is a block diagram that illustrates the Collection Frequency dialog box displayed by the Data Collector upon receipt of an appropriate command;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A user that needs to monitor the performance of a particular process or task from more than one workstation typically runs a separate copy of the performance monitoring software on each workstation. Prior to the present invention, each copy of this software gathered performance data directly from the monitored process. As a consequence, the process is burdened with redundant monitoring workload, and exhibits a corresponding decline in performance relative to the user's production work.

The present invention addresses this problem by providing a Client/Server architecture that enables the distribution of performance and utilization data to many workstations after that data has been gathered from the monitored process. By gathering the data once from the monitored process and then sharing the data, the present invention allows the user to monitor performance and utilization from many locations while placing minimal burden on the system.

Figure 1:
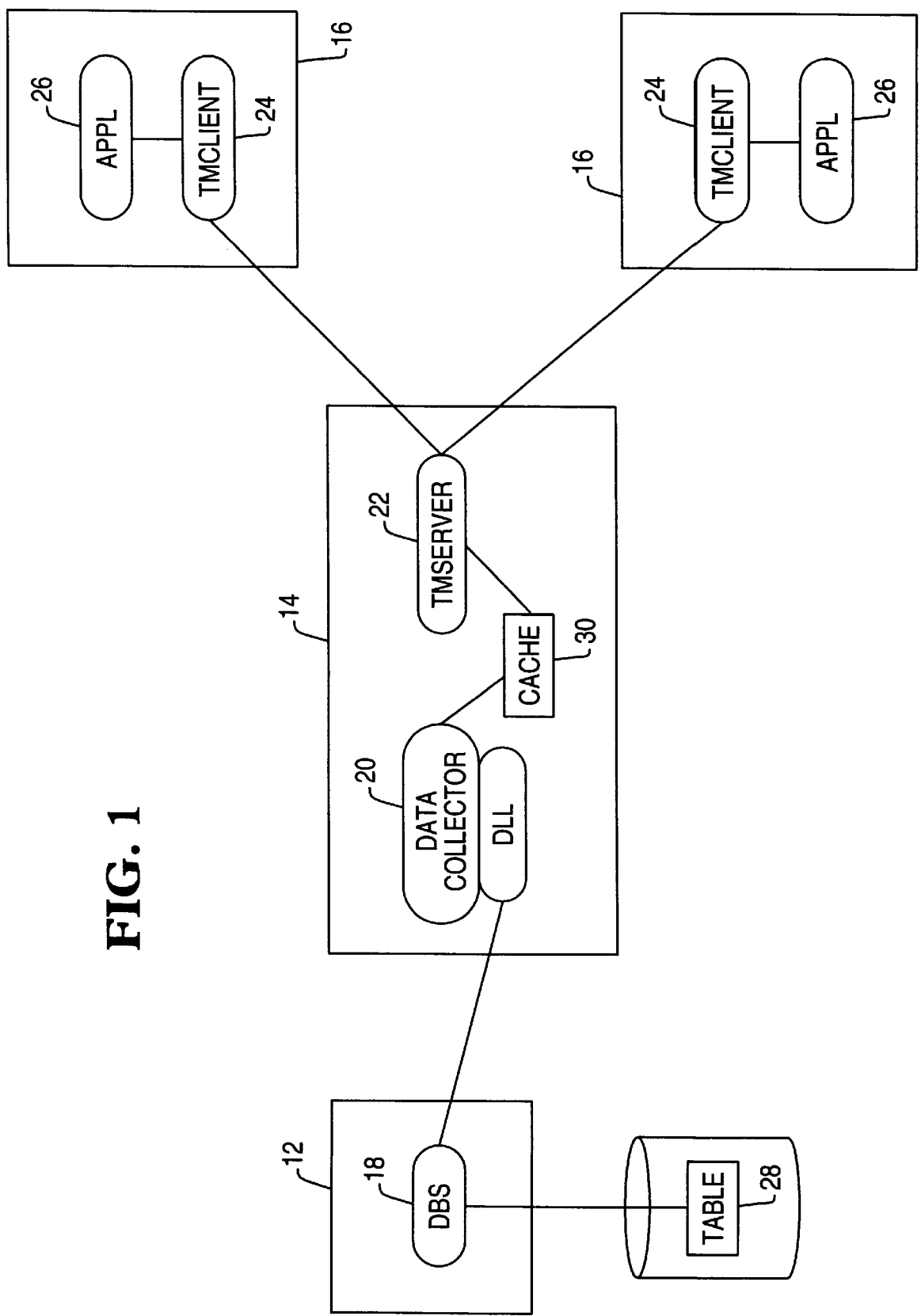
FIG. 1 is a block diagram that illustrates the Client/Server architecture (also known as a three-tier architecture) of an exemplary hardware environment for the present invention.

FIG. 1 is a block diagram that illustrates the Client/Server architecture (also known as a three-tier architecture) of an exemplary hardware environment for the present invention. The present invention is typically implemented using a computer network 10, which includes a plurality of interconnected servers 12 and 14 and workstations 16, each of which may comprise mainframes, minicomputers, workstations, LAN servers, personal computers, etc., and each of which may execute any number of different computer programs. Those skilled in the art will recognize that the exemplary environment illustrated in FIG. 1 is not intended to limit the present invention. Indeed, those skilled in the art will recognize that other alternative hardware environments may be used without departing from the scope of the present invention.

The present invention discloses a highly extensible and configurable data collection and distribution facility for one or more database systems (DBS) 18 executed by server 12. One or more Data Collector processes 20 executed by server 14 provide a single point of access to the DBS's 18 through which any data of interest may be collected. A Collector Dynamic Link Library (DLL) used by the Data Collector 20 defines the types of data being collected and the functions that perform the collection. One or more TMServer processes 22 executed by server 14 distribute the collected data to one or more TMClient processes 24 executed by one or more workstations 16 across the network 10. Any end-user application process 26 can take advantage of this facility by sending requests to and receiving data from the TMClient 24 using a protocol provided in this invention. Generally, a workstation 16 may execute many applications 26 with corresponding TMClients 24, all of which execute simultaneously.

Because data is collected once, the workload on the DBS 18 can remain constant while the number of TMClients 24, executing on behalf of applications 26, increases, thereby reducing redundant workload on the DBS 18 when multiple applications 26 require access to performance data. Also, since data is distributed via the TMServer 22, limits normally imposed by constraints within the DBS 18 on the number of simultaneous applications 26 can be avoided. Furthermore, the present invention can collect arbitrary types of data and distribute collected data to end-user applications 26 via a data exchange protocol.

Generally, the DBS's 18, Data Collectors 20, TMServers 22, TMClients 24, and user applications 26 comprise computer programs that are tangibly embodied in or readable from a computer-readable medium or carrier, e.g., fixed and/or removable data storage and/or data communication devices. These computer programs may be retrieved from such devices into the random access memory of one or more of the computer systems 12, 14, or 16 for execution. These computer programs comprise instructions which, when read and executed by a computer system 12, 14, or 16, cause the computer system 12, 14, or 16 to perform the steps necessary to execute the steps or elements of the present invention. Note that an exemplary configuration of these elements is illustrated in FIG. 1, and those skilled in the art will recognize that any number of such components may be used in accordance with the present invention.

Performance Data

The following list describes the types of performance data that can be gathered using the preferred embodiment of the present invention:

Monitor Physical Configuration: Gather overall information on node availability in the network 10, wherein a node is an individually addressable processor in a computer system connected in the network. Information regarding node status is returned for all nodes in the network 10.

Monitor Virtual Configuration: Gather overall information on virtual processor (vproc) availability, wherein a virtual processor is an individually addressable workspace in a computer system connected in the network. Information regarding vproc status is returned for all vprocs in the network 10.

Monitor Physical Summary: Gather information on overall system utilization on a node level. It can be especially useful when combined with Monitor Physical Configuration as a means of doing low impact system health checks.

Monitor Virtual Summary: Gather information on overall system utilization on vproc level. It can be especially useful when combined with Monitor Virtual Configuration as a means of doing low impact system health checks.

Monitor Physical Resource: Gather information about how each node is performing, along with the availability of each node. This could be useful for global system status information.

Monitor Virtual Resource: Gather information about how each vproc is performing, along with the availability of each vproc. This could be useful for global system status information.

Monitor Session: Gather information regarding the current activity of one or more logged on sessions. It can be especially useful when it appears that some particular jobs have become hung or as a means of determining overall system usage on a session by session basis.

Those skilled in the art will recognize that the present invention can handle arbitrary types of data and is not restricted to the types listed above. Thus, the types listed above are presented for illustration purposes only and should not be construed as a limitation of the present invention.

In the preferred embodiment, the performance data collected from the DBS 18 is represented in a linked-list data structure. Those skilled in the art will recognize that many other types of data structures could be used in place of the linked-list.

The linked-list data structure has meaning only in the local machine. Before sending the data to the TMClient 24, the linked-list may be parsed and changed into another format. When the TMClient 24 receives the data, it may also re-format the data for the use of performance monitoring applications.

Server Information Availability

A table (ServerInfo) 28 is created in the DBS 18 to store the information about the TMServers 22. The ServerInfo table 28 provides a central location and mechanism for TMServers 22 to register themselves and for TMClients 24 to find out what TMServers 22 are available. The ServerInfo table 28 is created on the DBS 18 and contains one row for each running TMServer 22. The TMClient 24 can transmit a SQL query to the DBS 18 to access the table 28.

In the preferred embodiment, the ServerInfo table 28 includes the following columns:

1) IPAddress: The Internet Protocol (IP) address of the server 14 executing the TMServer 22.
2) ServerName: The host name of the server 14 executing the TMServer 22.
3) ProfileName: The active profile under which the Data Collector 20 is running.
4) UserName: The name of a user that logged on to DBS 18.
5) DBSName: The DBS 18 name, used to identify the memory objects in the server 14 executing the TMServer 22.
6) DateTime: The date and time the Data Collector 20 started.
7) DataType: The performance data types that are currently being collected.
8) CurClients: The Number of TMClients 24 currently connected.
9) MaxClients: The maximum Number of TMClients 24 allowed to connect.
10) PortNumber: The TCP/IP port number used in the TMServer 22.

Those skilled in the art, however, recognize that any number of columns may be placed in the table 28, including information other than that recited above.

This table 28 is used by Data Collector 20, TMClient 24 and TMServer 22. The Data Collector 20 inserts a new row into the table 28 at startup and deletes the corresponding row when terminated. Any change in the type of data that is collected, the number of TMClients 24 connected, and the maximum number of TMClients 24 allowed to connect, causes an update to the DataType, CurClients and MaxClients columns, respectively.

A ServerInfo DLL or API is provided by the present invention and contains functions that are used by the Data Collector 20, TMServer 22, and TMClients 24 to insert, delete, update, and retrieve information to/from the ServerInfo table 28.

Data Collector

The Data Collector 20 is the component that gathers performance data from the DBS 18 and caches 30 it on the server 14. Each server 14 has one or more Data Collectors 20 running—one or more Data Collector 20 for each DBS 18 being monitored.

The Data Collector 20 gathers data from the DBS 18 in a multi-threaded manner, i.e., different types of data can be collected in parallel. This makes the overall collection mechanism efficient by reducing the need for serial collection of the various types of data.

Figure 2:
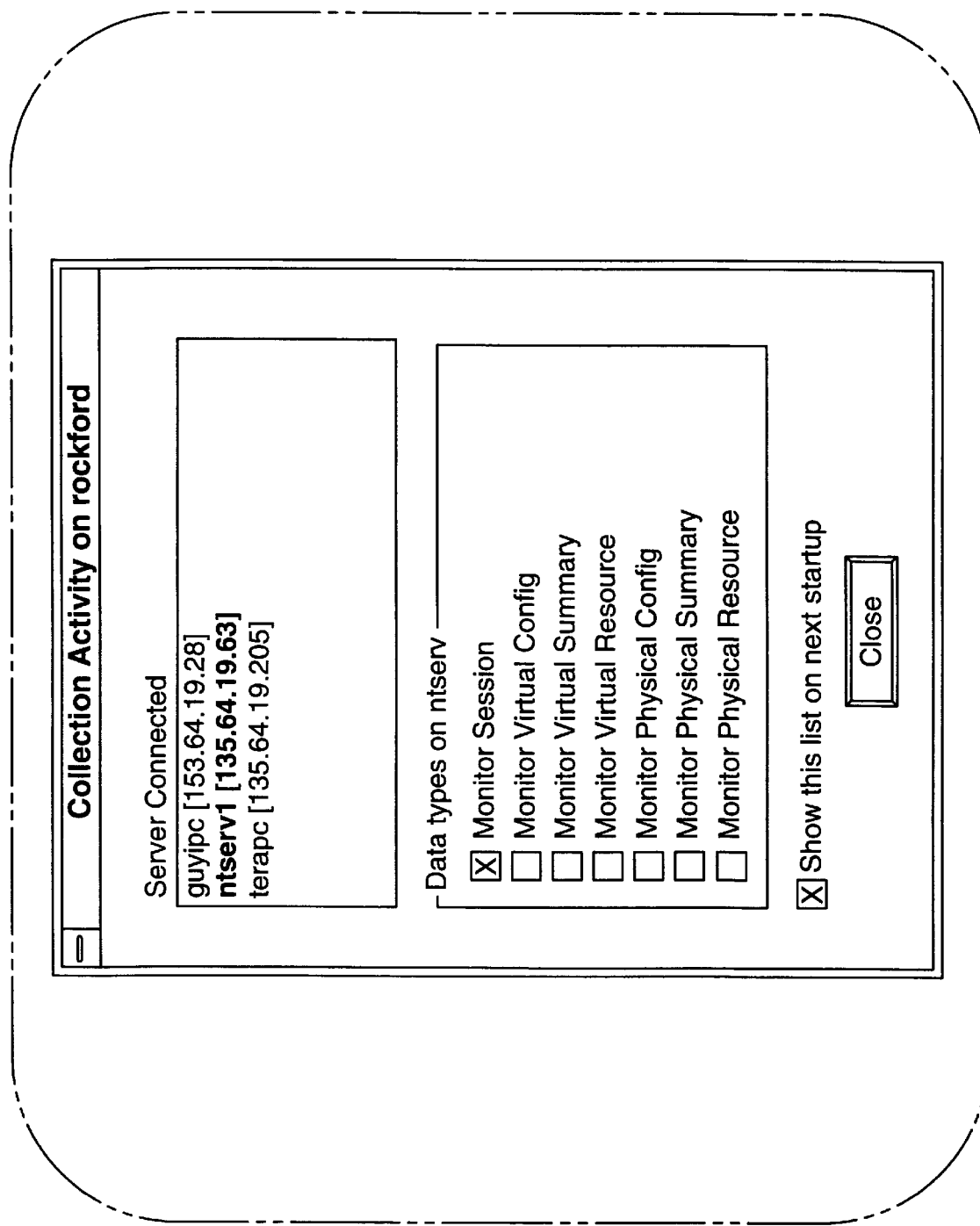
FIG. 2 is a block diagram that illustrates a dialog box displayed by the Data Collector.

A graphical user interface (GUI) provided by the Data Collector 20 allows the user to start, stop, and control the frequency of collection for each of the various types of DBS 18 performance data. The dialog box of FIG. 2 is displayed by the Data Collector 20 at startup. The information in this dialog box is retrieved from the ServerInfo table 28 of the associated DBS 18.

Selecting a TMServer 22 from the dialog box enables the grouped checkboxes displayed below the list of TMServers 22 and displays the data types that are being collected for the selected TMServer 22. The checkboxes are for information only and are not selectable by the user.

Clicking the Close button displays a confirmation dialog asking the user whether or not to proceed with startup. If the user responds by clicking No, the Data Collector 20 exits. Clicking Yes causes the Data Collector 20 to update the ServerInfo table 28, which includes deleting any obsolete rows and inserting a new row associated with the Data Collector 20 and TMServer 22 that are starting. The Data Collector 20 also starts the TMServer 22 if it is not already running. After initialization and updating of the ServerInfo table 28, the Data Collector 20 starts to collect data from the DBS 18.

When terminated normally from the exit command, the Data Collector 20 deletes the row that is associated with the TMServer 22.

The Data Collector 20 uses the Collector DLL to provide the flexibility to collect arbitrary types of data from arbitrary sources. The Collector DLL defines the set of data types to be collected and provides the functions that perform the actual data collection. The functions also put the collected data into shared memory, so that the TMServer 24 can subsequently read the data.

The Data Collector 20 itself provides a generic operational "shell". For each type of data specified by the Collector DLL, the Data Collector 20 creates a thread of execution; each thread periodically executes a data collection function provided by the Collector DLL for the specified data type. The Data Collector 20 provides a graphical user interface that allows the user to define the interval of data collection to be used for each data type, as shown in FIG. 3.

The Collector DLL exports a list of data structures that is used by the Data Collector 20 to determine how many types of data to collect, how to call the DLL's collection function, and what names to display in the Collection Frequency dialog, as shown in FIG. 3. In C language syntax, the individual data structure looks like this:

```
struct TM_DATA_DESCR
{
    int     id;         /*Data type id */
    char    name;       /*Data type name */
    char    shmem;      /*Shared memory label */
}
``` wherein:

id is a unique integer identifier assigned to each data type. The id values should be defined in powers of 2 so as to be bitwise-exclusive (i.e. 1,2,4,8, . . . ). This allows them to be stored as a bitmask in the DataType column of the ServerInfo table.

name is a unique string, or label, that describes each data type. The Data Collector displays the names in the Collection Activity (see FIG. 2) and Collection Frequency (see FIG. 3) dialogs.

shmem is a unique string, or label, that is used to identify the shared memory region in which the data is stored.

The Data Collector 20 reads the list of TM_DATA_DESCR structures during the startup and initializes a set of threads—one thread for each data type. Each thread periodically executes the collection function provided by the Collector DLL, passing the id of the data type to be collected as a parameter to the function. The collection function executes within the context of the individual threads (thus, multiple copies of the function may be executing simultaneously in different contexts), collecting the specified data and writing the data into shared memory.

The shared memory created by the collection function is assigned a distinct label, made up of the DBS 18 name concatenated with shmem.

By changing the list of TM_DATA_DESCR structures and the collection function in the Collector DLL, one can collect and monitor arbitrary types of data from arbitrary sources.

Collection Activity Command

Selecting a Collection Activity command from a menu of the Data Collector 20 opens a dialog box similar to the dialog box illustrated in FIG. 2. The user can use this dialog box to find out the current collection activity against the associated DBS 18. Clicking the check box labeled "Show this list on next startup" turns on or off the automatic display of this dialog box when the Data Collector 20 starts. If the check mark appears, the dialog box is displayed automatically and collection only begins after the user confirms startup. If the check mark is missing, the Data Collector 20 starts up without displaying the dialog and waiting for confirmation from the user. Clicking the Close button will close the dialog.

Collection Frequency Command

FIG. 3 is a block diagram that illustrates the Collection Frequency dialog box displayed by the Data Collector 20 upon receipt of an appropriate command. The installation defaults are to collect all data types for which current DBS 18 sampling rates are enabled (greater than 0), with matching collection frequencies. The Current Collection Frequencies show the current rates or how often the Data Collector 20 collects the selected data types from the DBS 18. The Current DBS Rates show the current data sampling rates inside the DBS 18. The user can change the Collection Frequencies to any value between 0 and 3600 seconds inclusive, by typing the new values in the New Collection Frequencies edit boxes. The data type check boxes are used to change the data types being collected.

Each performance monitoring application 26 uses one or more data types. The relationship between data types and applications can be found by clicking the "Help" button. The "Sync w/DBS" button is used to synchronize data collection frequencies with the sampling frequencies of the DBS 18. Clicking this button causes each of the DBS 18 frequencies to be copied automatically into the corresponding "New Collection Frequency" edit boxes. Clicking "OK" closes the dialog and updates the rates on the Data Collector 20, if they have been modified. Clicking "Cancel" closes the dialog without modifying the collection rates.

While the Data Collector 20 is running, the user can open up this dialog at anytime to change the collection frequency and the data types being collected. The latest collection frequencies and data types are saved in persistent storage and used as current values for the next start up. Current DBS Rates are retrieved from the DBS 18 when the dialog is displayed.

Set System Rate Command

Figure 4:
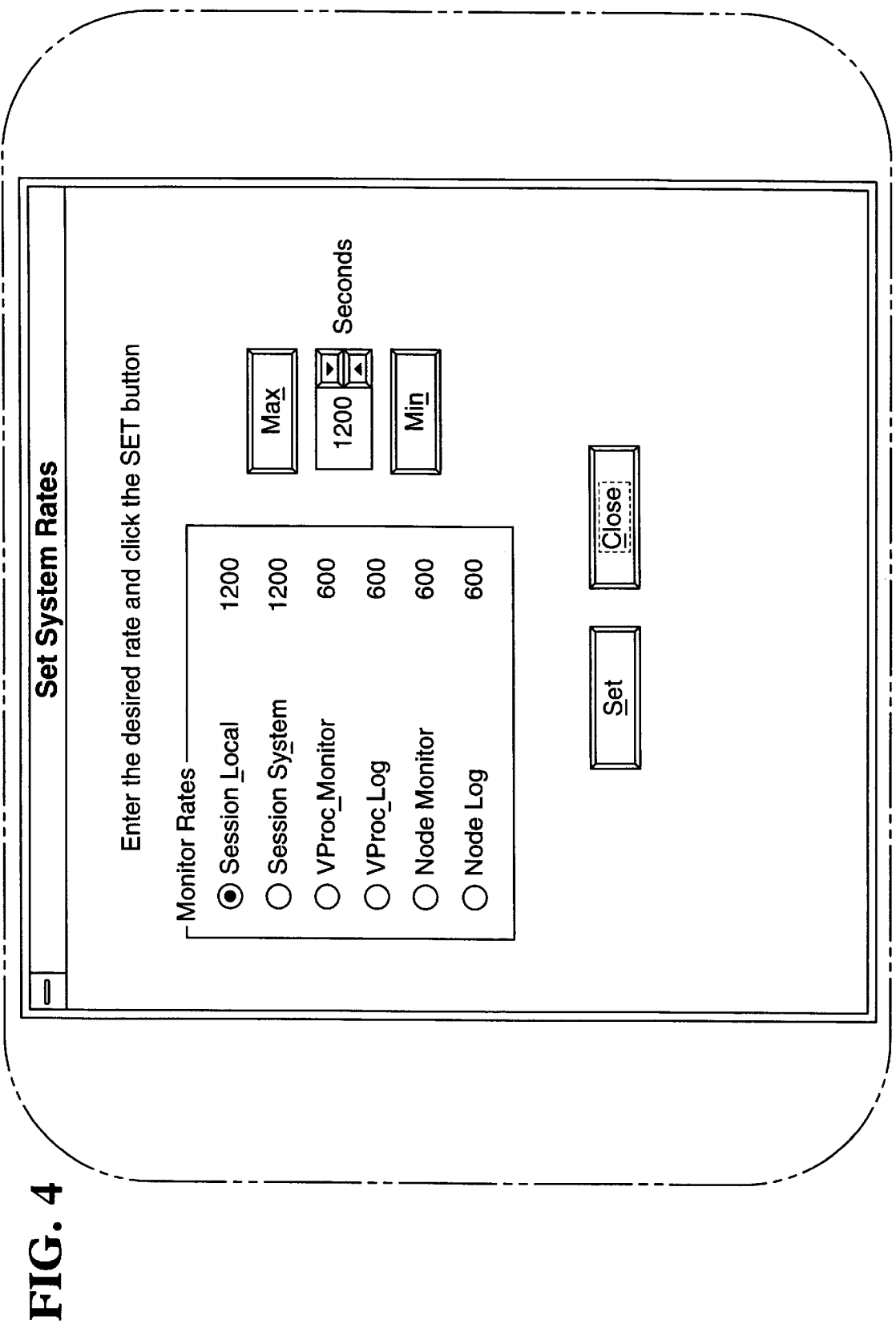
FIG. 4 is a block diagram that illustrates the Set System Rates dialog box displayed by the Data Collector upon receipt of an appropriate command.

FIG. 4 is a block diagram that illustrates the Set System Rates dialog box displayed by the Data Collector 20 upon receipt of an appropriate command. The dialog box allows the user to change the DBS 18 system rates.

The edit boxes inside the group box "Monitor Rate" display the current system rate values. The user can change a system rate by first selecting the type of monitor rate using the radio buttons, then setting a new value by using the spin buttons or typing the new value into the edit box next to the spin button, and finally clicking the Set button to set the system rate that is associated with the selected type of monitor rate. The user repeats the steps to change another rate, or click on the Close button to close the dialog.

The user can specify any value between 0 and 3600 seconds inclusive for the new system rate. The Vproc Log and Node Log rates must be an integral multiple of the corresponding non-zero Vproc Monitor and Node Monitoring rates.

TMServer Process

The TMServer 22 is the component that enables the distribution of performance data to many workstations 16. It runs on the server 14, listening for and responding to requests from TMClients 24 by sending data from the cache 30 created by the Data Collector 20. The graphical user interface (GUI) of the TMServer 22 allows the user to identify the data that are to be shared with TMClients 24. Further, a limit on the number of TMClients 24 allowed to connect to the TMServer 22 can be set via the graphical user interface.

Figure 5:
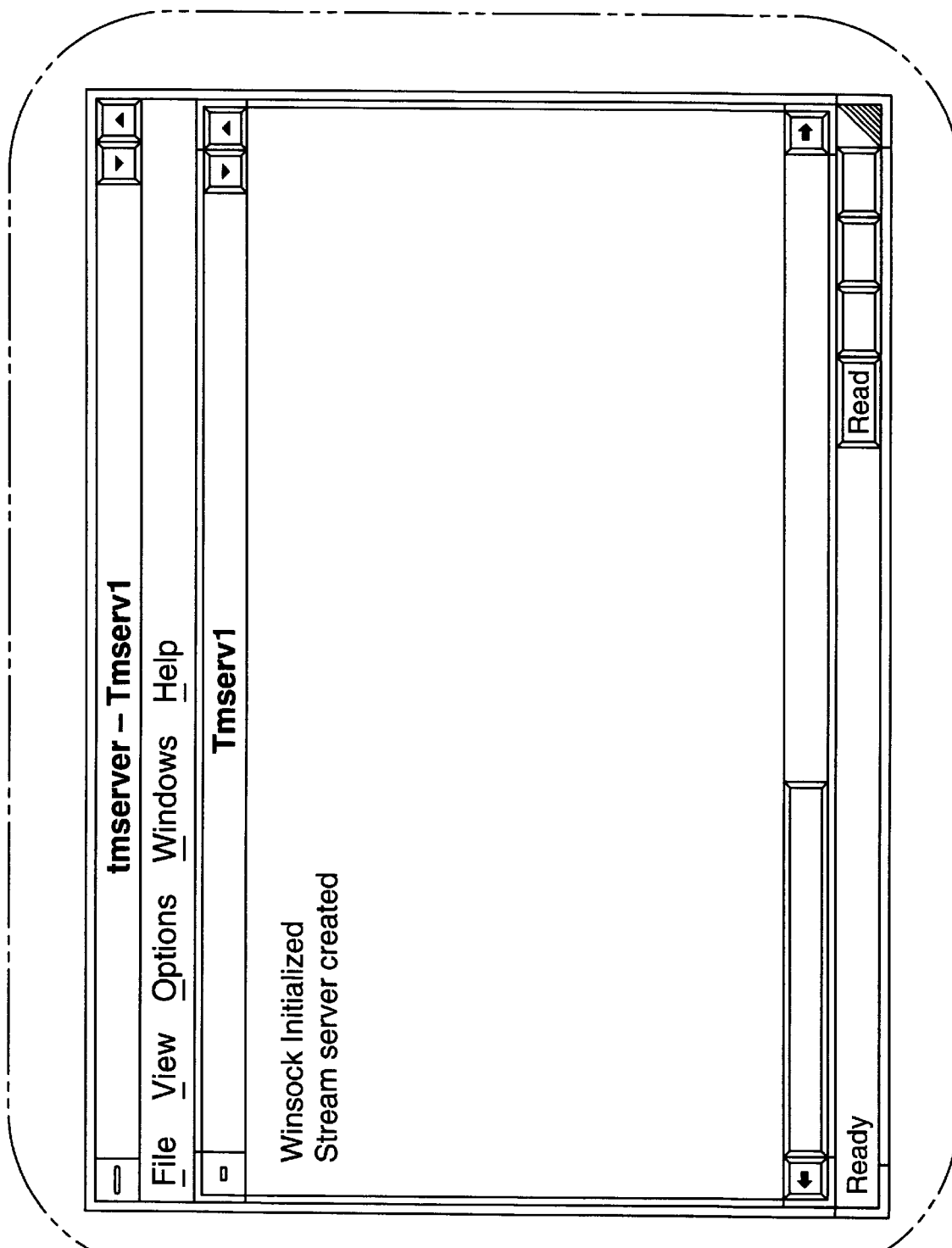
FIG. 5 is a block diagram that illustrates the window used to log TMServer activity and events such as TMClient connections.
Figure 6:
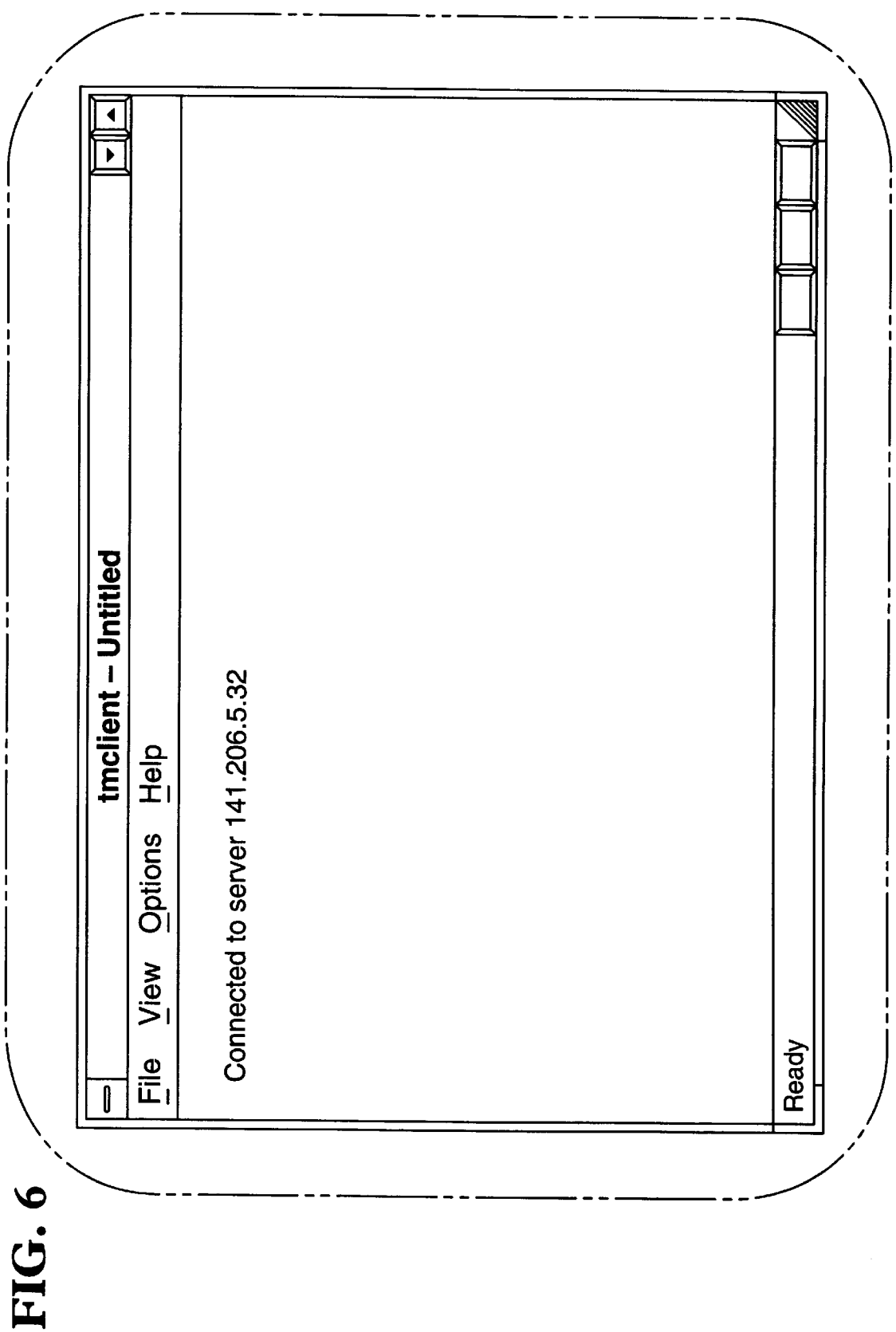
FIG. 6 is a block diagram that illustrates the window opened for each successful TMClient connection.

The TMServer 22 can be manually started or automatically started from the Data Collector 20. The manual start option allows the user to re-start the TMServer 22 if the TMServer 22 were to stop running for some reason. The TMServer 22 updates the CurClients column of the ServerInfo table 28 when a TMClient 24 is successfully connected or disconnected. A window is used to log TMServer 22 activity and events such as TMClient 24 connections, as shown in FIG. 5. A new window is opened for each successful TMClient 24 connection, as shown in FIG. 6. This window is used to log the activities between the TMServer 22 and the connected TMClient 24. For example, if there are four TMClients 24 connected to the TMServer 22, there will be five windows—one to display TMServer 22 activity and four for the connected TMClients 24.

Client Connection Limit

Figure 7:
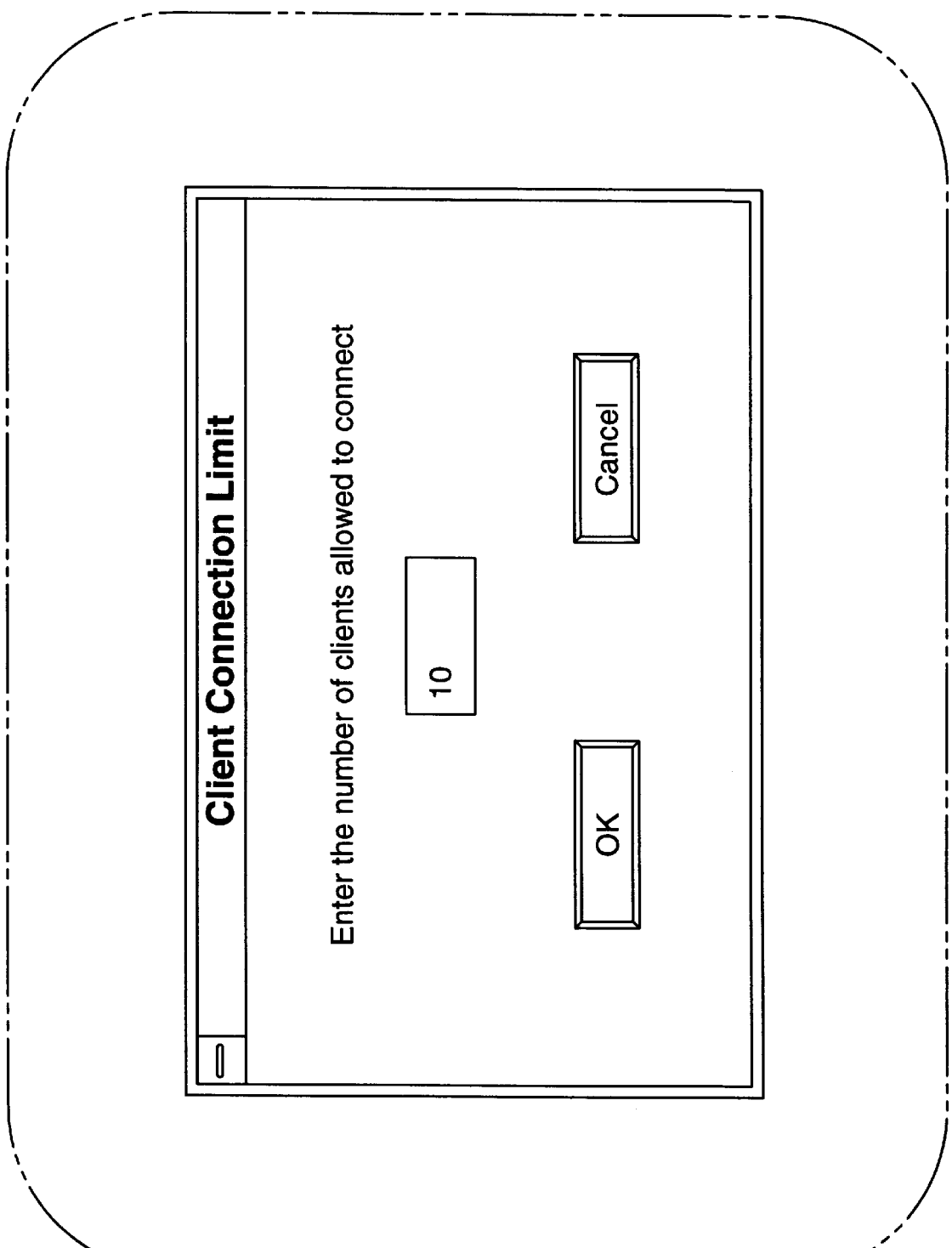
FIG. 7 is a block diagram that illustrates the dialog box that is displayed by the TMServer when the Client Connection Limit command is selected.

The dialog box of FIG. 7 is displayed by the TMServer 22 when the Client Connection Limit command is selected. The installation default value for the number of TMClients 24 allowed to connect is 10. This default is used if a value has not been saved in persistent storage on the server 14 during a previous execution of the TMServer 22. Depending on the hardware configuration of the server 14, the user can increase or decrease this number for optimal performance.

If a TMServer 22 has already reached its limit and a TMClient 24 requests connection, the TMServer 22 sends a message to inform the TMClient 24 that the TMServer 22 has reached its maximum capacity. Clicking OK saves the changed value in persistent storage to be used for next start up and updates the MaxClients column of ServerInfo table 28.

If the user sets the TMClient 24 connection limit to a value lower than the number of TMClients 24 that are currently connected, an error message is displayed informing the user that the currently connected TMClients 24 is xxx and advising the user to set a value greater than or equal to xxx, where xxx is the current CurClients value in the ServerInfo table 28.

TMClient Process

The TMClient 24 is the component that manages the connection with a remote TMServer 22 on behalf of local performance monitoring applications 26. It relays data requests to the TMServer 22 and delivers the results to the requesting applications 26. The graphical user interface (GUI) of the TMClient 24 presents the user with a list of TMServers 22 that are sharing DBS 18 performance data, and allows the user to choose the TMServer 22 with which to establish a connection.

The TMClient 24 component generally executes on the same workstation 16 as the end-user programs 26 (e.g., management and administrative applications). The TMClient 24 provides a network-aware facility through which end-user programs 26 ask for and receive data. These end-user programs 26 communicate with the TMClient 24 via an application programming interface (API) provided by the present invention. The TMClient 24 provides a graphical user interface (GUI) that allows an end-user to identify a TMServer 22 from which to get data.

Figure 8:
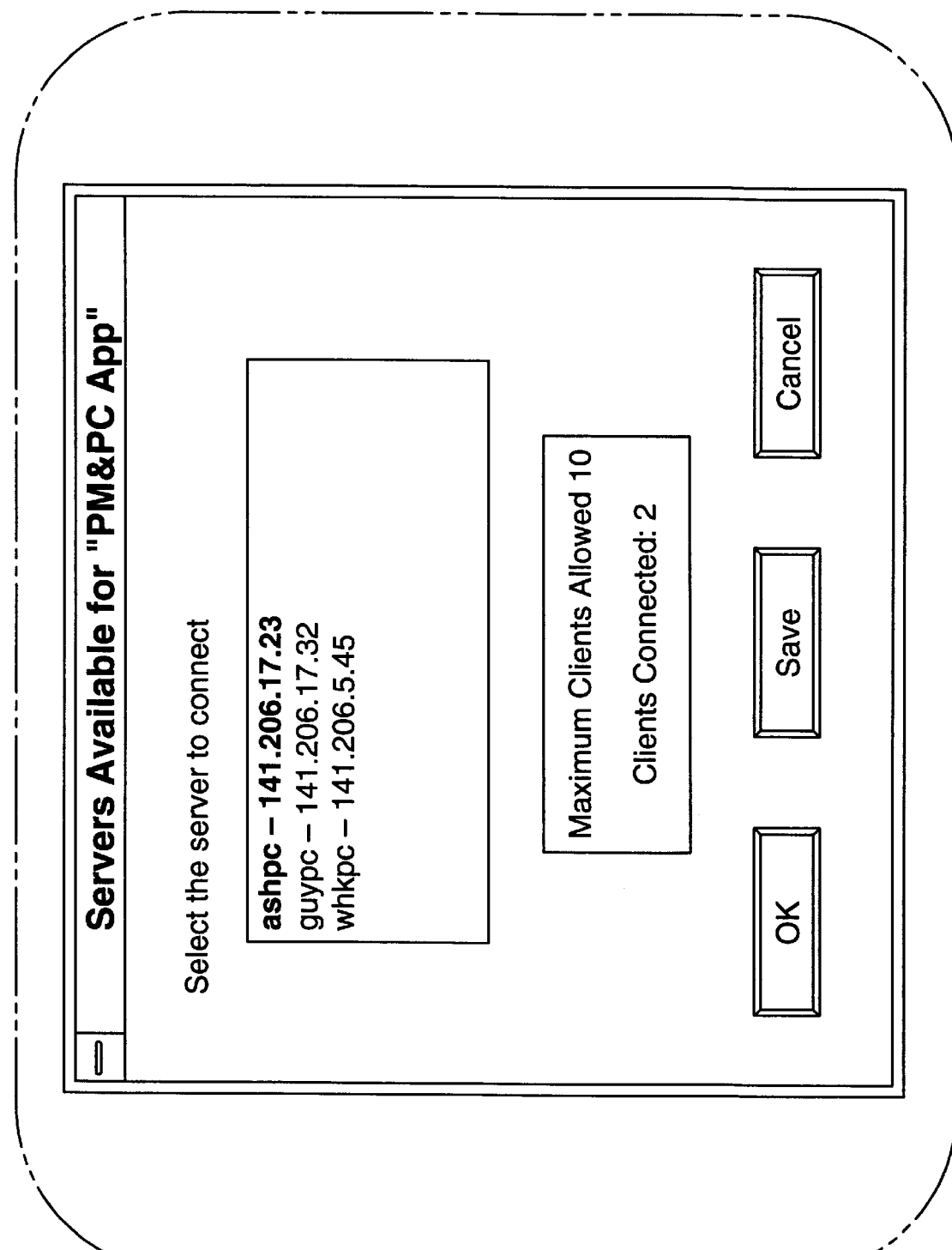
FIG. 8 is a block diagram that illustrates the dialog box that is displayed by the TMClient when the Server Selection command is selected.

The TMClient 24 is started by the performance monitoring application 26 (one TMClient 24 per each performance monitoring application 26). If the TMClient 24 is not automated, a dialog box as illustrated in FIG. 8 is displayed to prompt the user for the TMServer 22 name. The "PM&PC" name on the title bar will be replaced by the application name 26 that started the TMClient 24.

All the information, including the hostname and IP address, in this dialog box is retrieved from the ServerInfo table 28 on the associated DBS 18. If the application 26 does not have the privilege of using the table 28, an error message box is displayed to inform the user that he has no privilege to use the shared data on the system. Except for the "Cancel" button, all the dialog items are disabled at start-up. The listbox under "Select the server to connect" is enabled when the request for TMServer 22 information is completed. If no TMServer 22 information is available in the DBS 18, an entry of "No Data Server Available" is inserted in the list box. Otherwise, the TMServer 22 hostnames and IP addresses are displayed in the list box. Only the TMServers 22 that have the data types available for the associated performance monitoring application 28 are shown in the list box. Selecting a TMServer 22 name from the list box enables the group box displayed underneath. The "Maximum Clients Allowed" field shows the maximum number of TMClients 24 allowed to connect, as previously described. The "Clients Connected" field shows the number of TMClients 24 that are currently connected to the TMServer 22. With this information, the user can decide which TMServer 22 to connect in order to balance the workloads of the TMServers 22. Clicking the "Save" button saves the host name of the selected TMServer 22 in persistent storage for automation.

Clicking OK from the "Server Available" dialog causes the TMClient 24 to proceed with startup and connect to the selected TMServer 22. Upon successful connection, the TMClient 24 runs in minimized mode. An icon will appear in the lower left corner of the screen.

The user can run the TMClient 24 at a default standard window size by double clicking on the icon. If the TMClient 24 is unable to connect to the TMServer 22 because of a invalid TMServer 22 name or the TMServer 22 is down, a message box is displayed informing the user of the problem. The user clicks OK on the message box to acknowledge the error message and to return to the "Server Available" dialog.

If the user clicks the CANCEL button on the "Servers Available" dialog, a confirmation dialog is displayed asking the user to confirm his/her choice to terminate the TMClient 24 and warn the user that performance data will not be available.

The TMClient 24 displays a window as shown in FIG. 6 to indicate a successful connection. All future activities initiated from the TMClient 24 are recorded in this window.

Server Selection

Selecting the Server Selection command causes the TMClient 24 to display the start up dialog described previously in FIG. 8. It allows the user to connect to a different TMServer 22 while the application 26 is running. Clicking OK disconnects the TMClient 24 from the currently connected TMServer 22 and then establishes a new connection between the TMClient 24 and the selected TMServer 22. The TMServer 22 updates the ServerInfo table 28 to maintain a current status for the Client/Server connection. Clicking Save saves the TMServer 22 hostname in persistent storage for use in automation. Clicking Cancel dismisses the dialog, while the TMClient 24 continues executing.

Automation

The user can automate the TMClient 24 by saving the hostname of the TMServer 22 and selecting the "Auto-Start Client Application" option under the preference option of the performance monitoring application 26. When automated, the TMClient 24 connects to the designated TMServer 22 without prompting the user for TMServer 22 name. Upon successful connection, it runs in minimized mode and is ready to accept a request from the associated performance monitoring application 26. If the connection fails, an error message box is displayed to notify the user and the "Server Available" dialog then appears. The user can select another TMServer 22 to connect from that dialog.

Performance Application

Figure 9:
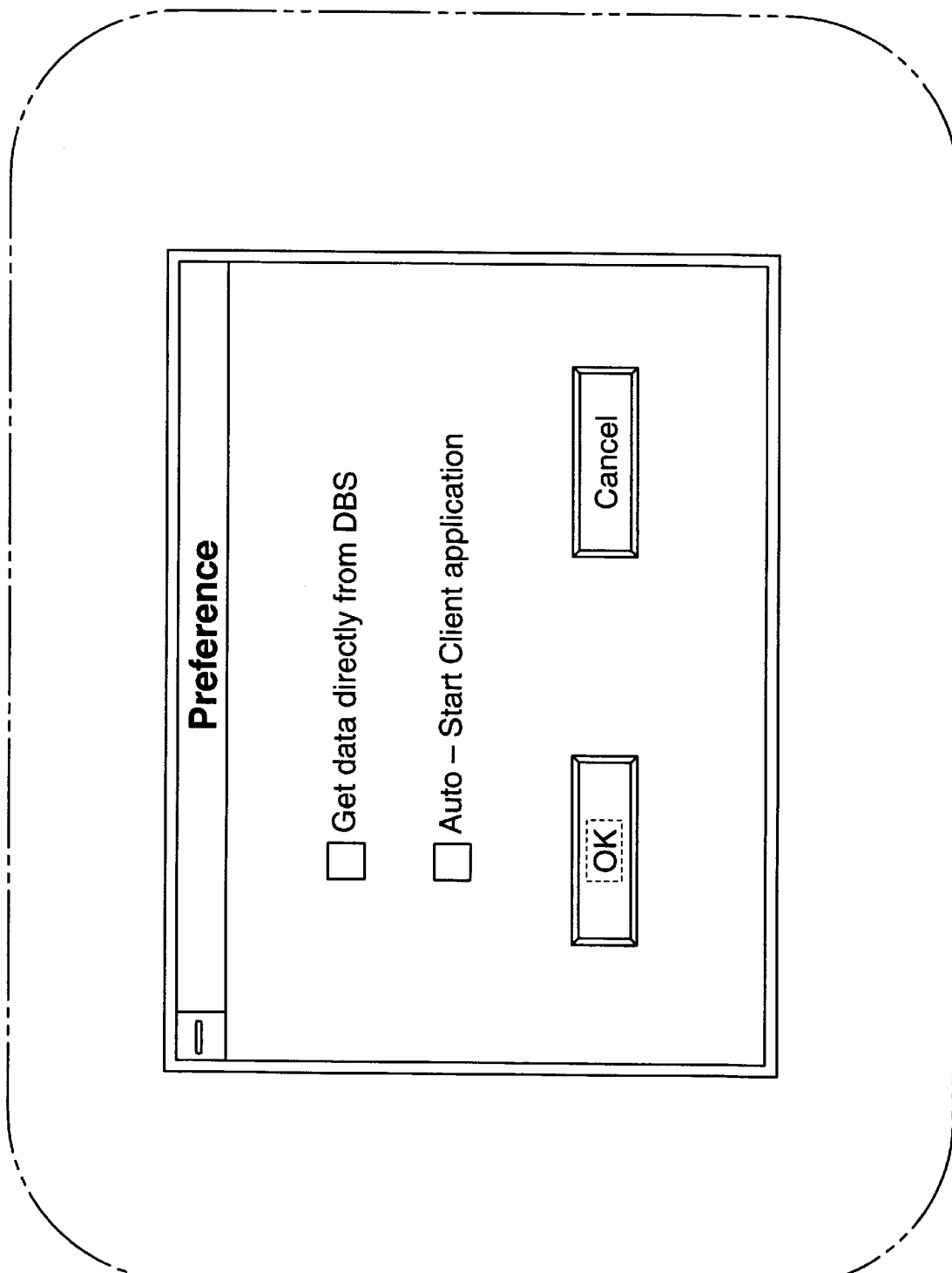
FIG. 9 is a block diagram that illustrates the dialog box that is displayed by the performance monitoring application to support the Client/Server functions of the present invention.

The preference dialog box similar to that shown in FIG. 9 is displayed by each performance monitoring application 26 to support the Client/Server functions. Selecting the "Get data directly from DBS" option forces the application 26 to collect data directly from DBS 18. Otherwise, it starts a TMClient 24 to gather data from the TMServer 22. This option can be set during installation. The user can specify the default start up of each performance monitoring application 26 by selecting or de-selecting the "Get data directly from DBS" option of the installation dialog.

The second option "Auto-Start Client application" is enabled only if the user de-selects the "Data from DBS" option. This option enables the TMClient 24 to connect to the designated TMServer 22 automatically without any user input. Clicking OK saves the values in persistent storage for use in the next start-up.

Conclusion

This concludes the description of the preferred embodiment of the invention. In summary, a performance monitoring system has been described that uses a client/server architecture across a network including a plurality of interconnected computers. A data collector process collects and stores data from a monitored process, wherein the data collector process allows a user to control a frequency of collection for each of one or more different types of the collected data and gathers the different types of the collected data in parallel from the monitored process. A server process distributes the data collected by the data collector process to one or more client processes. Each client process manages a connection with the server process on behalf of one or more performance monitoring applications and relays data requests to the server process and delivers results therefrom to the performance monitoring applications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for gathering and distributing performance and utilization data, comprising:

a network including a plurality of interconnected computers;

a data collector process executed by a computer for collecting data from a monitored process and for storing the collected data, wherein the data collector process allows a user to control a frequency of collection for each of one or more different data types of the collected data and gathers the different types of the collected data in parallel from the monitored process;

a server process executed by a computer for distributing the data collected by the data collector process; and one or more client processes executed by one or more computers for receiving the distributed data from the server process across the network, wherein the client process manages a connection with the server process on behalf of one or more performance monitoring applications and relays data requests to the server process and delivers results therefrom to the performance monitoring applications.

2. The system of claim 1 above, further comprising a dynamic link library (DLL) executed by a computer for exposing a set of data types and functions that can be invoked by the data collector process to collect the data.

3. The system of claim 1 above, wherein a table stores information about the server processes.

4. The system of claim 3 above, wherein the table contains one row for each active server process.

5. The system of claim 4 above, wherein the data collector process inserts a row into the table when a server process is started and deletes the row when the server process is terminated.

6. The system of claim 3 above, wherein the client process accesses the table in order to connect to the server process.

7. The system of claim 3 above, wherein the table includes one or more data items selected from a group comprising:

an address of the computer executing the server process;

a name of the computer executing the server process;

an active profile for the data collector process;

a user that is logged onto the monitored process;

a name of the monitored process;

a date and time the data collector process started;

one or more identifiers representing the types of data that are currently being collected;

a number of client processes currently connected to the server process;

a maximum number of client processes allowed to connect to the server process; and a network port number used in the server process.

8. The system of claim 1 above, wherein the server process transmits only specified data collected by the data collector process to the client process.

9. A system for gathering and distributing performance and utilization data, comprising:

a network including a plurality of interconnected computers;

a data collector process executed by a computer for providing access to a monitored process through which any data of interest may be collected;

a server process executed by a computer for distributing the collected data;

one or more client processes executed by one or more computers for receiving the distributed data from the server process across the network; and one or more application processes executed by one or more computers for sending requests to and receiving data from the client process.

10. The system of claim 9 above, further comprising a dynamic link library (DLL) executed by a computer for exposing a set of data types and functions that can be invoked by the data collector process to collect the data.

11. The system of claim 9 above, wherein a table stores information about the server processes.

12. The system of claim 11 above, wherein the table contains one row for each active server process.

13. The system of claim 12 above, wherein the data collector process inserts a row into the table when a server process is started and deletes the row when the server process is terminated.

14. The system of claim 11 above, wherein the client process accesses the table.

15. The system of claim 11 above, wherein the table includes one or more data items selected from a group comprising:

an address of the computer executing the server process;

a name of the computer executing the server process;

an active profile for the data collector process;

a user that is logged onto the monitored process;

a name of the monitored process;

a date and time the data collector process started;

one or more identifiers representing the types of data that are currently being collected;

a number of clients processes currently connected to the server process;

a maximum number of client processes allowed to connect to the server process; and a network port number used in the server process.

16. The system of claim 9 above, wherein the data collector process caches the collected data.

17. The system of claim 9 above, wherein the data collector process includes means for allowing a user to control a frequency of collection for each of one or more different types of collected data.

18. The system of claim 17 above, wherein the data collector process includes means for gathering the different types of data in parallel from the monitored process.

19. The system of claim 9 above, wherein the server process responds to requests from client process by transmitting data collected by the data collector process to the client process.

20. The system of claim 19 above, wherein the server process transmits only specified data collected by the data collector process to the client process.

21. The system of claim 9 above, wherein the client process manages a connection with a remote server process on behalf of local performance monitoring application.

22. The system of claim 9 above, wherein the client process relays data requests to the server process and delivers results therefrom to a requesting application.

23. A method of gathering and distributing performance and utilization data, comprising the steps of:

collecting data from a monitored process;

distributing the collected data from a server to one or more client processes executed by one or more computers, wherein the client processes manages a connection with the server process on behalf of a local performance monitoring application and relays data requests to the server process and delivers results therefrom to the application.

* * * * *